United States Patent
Hou et al.

(10) Patent No.: US 12,444,112 B2
(45) Date of Patent: Oct. 14, 2025

(54) CONTENT PUBLISHING METHOD AND APPARATUS, COMPUTER DEVICE, AND STORAGE MEDIUM

(71) Applicant: Beijing Bytedance Network Technology Co., Ltd., Beijing (CN)

(72) Inventors: Yining Hou, Beijing (CN); Guiyan Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/719,200

(22) PCT Filed: Feb. 8, 2023

(86) PCT No.: PCT/CN2023/074859
§ 371 (c)(1),
(2) Date: Jun. 12, 2024

(87) PCT Pub. No.: WO2023/165301
PCT Pub. Date: Sep. 7, 2023

(65) Prior Publication Data
US 2024/0420396 A1    Dec. 19, 2024

(30) Foreign Application Priority Data
Mar. 1, 2022 (CN) .......................... 202210198069.4

(51) Int. Cl.
*G06T 11/60* (2006.01)
(52) U.S. Cl.
CPC .......... *G06T 11/60* (2013.01); *G06T 2200/24* (2013.01)
(58) Field of Classification Search
CPC . G06T 11/60; G06T 2200/24; G06F 3/04845; G06F 3/0483; G06F 3/04886; G06F 2203/04803

(Continued)

(56) References Cited

U.S. PATENT DOCUMENTS 9,196,228 B2 * 11/2015 Kim ................... H04N 21/4325
2005/0102618 A1  5/2005 Naito
(Continued)

FOREIGN PATENT DOCUMENTS

CN    103218429 A    7/2013
CN    111008933 A    4/2020
(Continued)

OTHER PUBLICATIONS

China National Intellectual Property Administration, Office Action and Search Report Issued in Application No. 202210198069.4, Jul. 1, 2023, 16 pages.

(Continued)

*Primary Examiner* — Hwei-Min Lu
(74) *Attorney, Agent, or Firm* — Alleman Hall & Tuttle LLP

(57) ABSTRACT

The present disclosure provides a content publishing method and apparatus, a computer device, and a storage medium. The method includes: obtaining in response to an edit command, an original picture and target text; determining, based on size information of the original picture, a target presenting approach corresponding to the size information; processing the original picture based on the target presenting approach, and presenting a picture-text media content in real time based on a processed target picture, the target text, and the target presenting approach; sending, upon receiving a publishing command, the picture-text media content to a server to cause the server to add the picture-text media content to information stream data, and push the information stream data to a target client for presentation on a full-screen presenting interface of the target client, wherein the full-screen presenting interface is used to present a single media content in the information stream data.

18 Claims, 9 Drawing Sheets

(58) Field of Classification Search
USPC .......................................................... 715/202
See application file for complete search history.

(56) References Cited

U.S. PATENT DOCUMENTS

| | | | | |
|---|---|---|---|---|
| 2006/0214953 | A1* | 9/2006 | Crew | G06T 3/40 345/660 |
| 2008/0189611 | A1 | 8/2008 | Ishii | |
| 2009/0067753 | A1* | 3/2009 | Hanechak | G06T 11/60 382/298 |
| 2010/0031149 | A1* | 2/2010 | Gentile | H04N 5/91 348/135 |
| 2011/0154406 | A1* | 6/2011 | Koo | H04N 21/41407 725/56 |
| 2011/0191328 | A1* | 8/2011 | Vernon | G11B 27/28 707/723 |
| 2012/0207452 | A1* | 8/2012 | Wang | G11B 27/034 386/E5.028 |
| 2013/0239031 | A1* | 9/2013 | Ubillos | G06F 3/04817 715/810 |
| 2014/0193047 | A1* | 7/2014 | Grosz | G06Q 10/10 382/118 |
| 2015/0154164 | A1* | 6/2015 | Goldstein | G06F 40/106 715/229 |
| 2017/0116706 | A1* | 4/2017 | Chen | G06T 3/40 |
| 2018/0253824 | A1* | 9/2018 | Zhong | G06T 11/00 |
| 2021/0006867 | A1* | 1/2021 | Liu | H04N 21/4316 |
| 2021/0201364 | A1 | 7/2021 | Andreou | |
| 2021/0227231 | A1* | 7/2021 | Hannuksela | H04N 19/176 |
| 2022/0245681 | A1* | 8/2022 | Han | G06F 3/0486 |
| 2024/0104812 | A1* | 3/2024 | Liu | G06T 11/60 |

FOREIGN PATENT DOCUMENTS

| | | | | |
|---|---|---|---|---|
| CN | 111506917 | A | | 8/2020 |
| CN | 111580721 | A | | 8/2020 |
| CN | 112153418 | A * | 12/2020 | ......... H04N 21/8586 |
| CN | 112667835 | A | | 4/2021 |
| CN | 113592872 | A * | 11/2021 | ............... G06T 7/60 |
| CN | 113886610 | A * | 1/2022 | ............. G06F 16/45 |
| CN | 114564131 | A | | 5/2022 |

OTHER PUBLICATIONS

ISA China National Intellectual Property Administration, International Search Report Issued in Application No. PCT/CN2023/074859, Apr. 26, 2023, WIPO, 4 pages.
"How to create a video with one click on TikTok," Jiangzi Video Jingmen Nianruo Network Technology Co., Ltd., Available Online at https://m.jiangzi.com/tuwen/shuma/131422.html, Nov. 27, 2021, 14 pages.
China National Intellectual Property Administration, Supplementary Search Issued in Application No. 202210198069.4, Jul. 1, 2023, 1 page.
European Patent Office, Extended European Search Report for European Application No. 23762702.1, mailed Nov. 26, 2024, 11 pages.

* cited by examiner

CONTENT PUBLISHING METHOD AND APPARATUS, COMPUTER DEVICE, AND STORAGE MEDIUM

The present disclosure is a U.S. National Stage Application of PCT Application Serial No. PCT/CN2023/074859, filed Feb. 8, 2023, which claims the priority from the CN patent application No. 202210198069.4 filed with the China National Intellectual Property Administration on Mar. 1, 2022, the contents of which are hereby incorporated by reference in their entireties.

FIELD

Embodiments of the present disclosure generally relate to the field of computers, and more specifically, to a content publishing method and apparatus, a computer device, and a storage medium.

BACKGROUND

When browsing media contents, a user may notice that a presenting interface typically presents preview information of multiple media contents, where each piece of preview information is generally comprised of a title, a cover and partial text. If desiring to browse more information, the user needs to click on the preview information to enter the details interface, and then, if desiring to browse details of other media contents, the user has to exit the current details interface and click on other preview information. Such method is cumbersome and reduces the user's reading efficiency.

SUMMARY

In a first aspect, embodiments of the present disclosure provide a content publishing method, comprising:
  in response to an edit command, obtaining an original picture and target text;
  determining, based on size information of the original picture, a target presenting approach corresponding to the size information;
  processing the original picture based on the target presenting approach, and presenting a picture-text media content in real time based on a processed target picture, the target text, and the target presenting approach; and
  sending, upon receiving a publishing command, the picture-text media content to a server to cause the server to add the picture-text media content to information stream data, and push the information stream data to a target client for presentation on a full-screen presenting interface of the target client, wherein the full-screen presenting interface is used to present a single media content in the information stream data.

In a possible implementation, the target presenting approach comprises at least one of first presenting area information of the processed target picture, second presenting area information of the target text, a presenting size of the target picture, and image area information to be presented in the original picture.

In a possible implementation, in response to the obtained original picture comprising a plurality of pictures, determining, based on the size information of the original picture, the target presenting approach corresponding to the size information comprises:
  determining a presenting approach of the plurality of pictures, the presenting approach comprising a sequential presenting, or a tile presenting; and
  determining, based on size information of the plurality of pictures, the target presenting approach corresponding to the size information and the presenting approach.

In a possible implementation, in response to the presenting approach being the sequential presenting, determining, based on the size information of the plurality of pictures, the target presenting approach corresponding to the size information and the presenting approach comprises:
  determining the target presenting approach based on size information of a first picture in the plurality of pictures.

In a possible implementation, determining the target presenting approach based on the size information of the first picture in the plurality of pictures comprises:
  determining, based on the size information of the first picture, a first presenting approach matching the first picture in the target presenting approach; and
  determining a second presenting approach of other pictures than the first picture based on a container size matching a presenting size of the first picture, and size information of the other pictures, in the first presenting approach.

In a possible implementation, in response to the presenting approach being the tile presenting, determining, based on the size information of the plurality of pictures, the target presenting approach corresponding to the size information and the presenting approach comprises:
  determining a picture presenting template matching a number of the plurality of pictures, the picture presenting template comprising a presenting position and a presenting size of at least one picture; and
  determining the target presenting approach based on the size information of the plurality of pictures, and the presenting size in the picture presenting template.

In a possible implementation, the method further comprises:
  in response to the edit command, obtaining the target text;
  generating the picture-text media content based on the target text; and
  upon receiving the publishing command, sending the picture-text media content to the server.

In a possible implementation, the method further comprises:
  in response to an adjusting operation for the original picture and/or the target text, adjusting the original picture and/or the target text;
  upon performing the adjusting, determining a third presenting approach corresponding to size information of the adjusted original picture;
  processing the original picture based on the target presenting approach, comprises: processing, based on the third presenting approach, the adjusted original picture.

In a second aspect, the embodiments of the present disclosure further provide a content publishing apparatus, comprising:
  an obtaining module for obtaining an original picture and target text in response to an edit command;
  a determining module for determining, based on size information of the original picture, a target presenting approach corresponding to the size information;
  a presenting module for processing the original picture based on the target presenting approach, and presenting a picture-text media content in real time based on a processed target picture, the target text, and the target presenting approach; and a sending module for sending the picture-text media content to a server, upon receiving a publishing command, to cause the server to add the picture-text media content to information stream data, and push the information stream data to a target client for presentation on a full-screen presenting interface of the target client, wherein the full-screen presenting interface is used to present a single media content in the information stream data.

In a possible implementation, the target presenting approach comprises at least one of first presenting area information of the processed target picture, second presenting area information of the target text, a presenting size of the target picture, and image area information to be presented in the original picture.

In a possible implementation, in response to the obtained original picture comprising a plurality of pictures, when determining, based on the size information of the original picture, the target presenting approach corresponding to the size information, the determining module is configured for:
    determining a presenting approach of the plurality of pictures, the presenting approach comprising a sequential presenting, or a tile presenting; and
    determining, based on size information of the plurality of pictures, the target presenting approach corresponding to the size information and the presenting approach.

In a possible implementation, in response to the presenting approach being the sequential presenting, when determining, based on the size information of the plurality of pictures, the target presenting approach corresponding to the size information and the presenting approach, the determining module is configured for:
    determining the target presenting approach based on size information of a first picture in the plurality of pictures.

In a possible implementation, when determining the target presenting approach based on the size information of the first picture in the plurality of pictures, the determining module is configured for:
    determining, based on the size information of the first picture, a first presenting approach matching the first picture in the target presenting approach; and
    determining a second presenting approach of other pictures than the first picture based on a container size matching a presenting size of the first picture, and size information of the other pictures, in the first presenting approach.

In a possible implementation, in response to the presenting approach being the tile presenting, when determining, based on the size information of the plurality of pictures, the target presenting approach corresponding to the size information and the presenting approach, the determining module is configured for:
    determining a picture presenting template matching a number of the plurality of pictures, the picture presenting template comprising a presenting position and a presenting size of at least one picture; and
    determining the target presenting approach based on the size information of the plurality of pictures, and the presenting size in the picture presenting template.

In a possible implementation, the sending module is further configured for:
    in response to the edit command, obtaining the target text;
    generating the picture-text media content based on the target text; and
    sending, upon receiving the publishing command, the picture-text media content to the server.

In a possible implementation, the apparatus further comprises:
    an adjusting module for adjusting the original picture and/or the target text in response to an adjusting operation for the original picture and/or the target text;
    the determining module further configured for determining, upon performing adjusting, a third presenting approach corresponding to size information of the adjusted original picture;
    when processing the original picture based on the target presenting approach, the presenting module is configured for:
    processing, based on the third presenting approach, the adjusted original picture.

In a third aspect, the embodiments of the present disclosure further provide a computer device, comprising: a processor, a memory and a bus, wherein the memory stores machine readable instructions executable by the processor, the processor and the memory communicate with each other via the bus when the electronic device is running, and the machine readable instructions, when executed by the processor, perform the steps of the first aspect, or the steps in any one possible implementation of the first aspect.

In a fourth aspect, the embodiments of the present disclosure further provide a computer readable storage medium having computer programs stored thereon, wherein the computer programs, when run by a processor, perform the steps of the first aspect, or the steps in any one possible implementation of the first aspect.

According to the content publishing method and apparatus, the computer device and the storage medium provided by the embodiments of the present disclosure, a picture-text media content can be presented in real time based on an original picture edited by a user and target text; after the picture-text media content is sent to a server, the server can add the picture-text media content to the information stream data, so that the target client can present the text-picture media content in full screen after obtaining the information stream data. With the method, the user of the target client can directly implement picture-text media content switch by switching information stream data, thus simplifying the operation process; presenting pictures and words on a screen enables the picture-text media content to be presented to the user more intuitively, to improve the user's reading efficiency.

In order to make the above objective, features and advantages of the present disclosure more apparent, description of optimal embodiments will be detailed below with reference to the drawings.

BRIEF DESCRIPTION OF THE DRAWINGS

In order to describe more clearly the technical solution according to the embodiments of the present disclosure, brief description of the drawings required in the respective embodiments will be provided below, where the drawings, which are incorporated into the Description and constitute a part thereof, illustrate embodiments consistent with the present disclosure and are used, together with the Description, to explain the technical solution of the present disclosure. It would be appreciated that the drawings below only illustrate some embodiments and thus should not be construed as limiting the scope, on the basis of which the ordinary skilled in the art could derive other related drawings, without doing creative work.

DETAILED DESCRIPTION OF EMBODIMENTS

Figure 1:
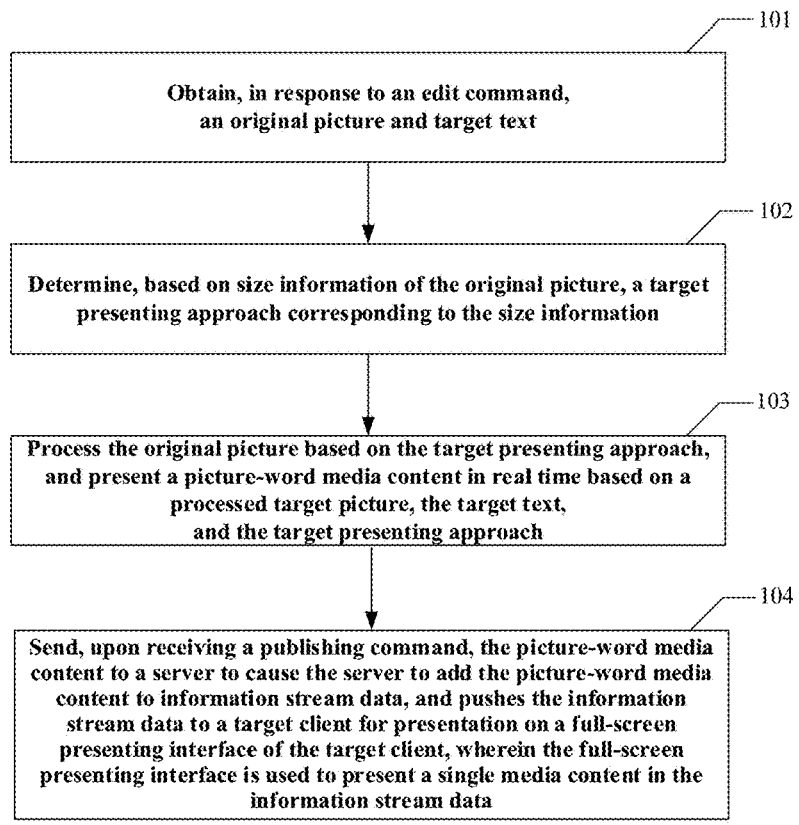
FIG. 1 illustrates a flowchart of a content publishing method provided by embodiments of the present disclosure.

In order to make the objective, the technical solution and the advantages of the embodiments of the present disclosure more apparent, reference below will be made to the drawings of the embodiments of the present disclosure to describe clearly and completely the technical solution according to the embodiments of the present disclosure. Apparently, the embodiments described herein are only part of the embodiments of the present disclosure, rather than all of them. Components according to the embodiments of the present disclosure, as depicted and shown in the drawings, may be arranged and designed in various different configurations. Therefore, the description of the embodiments of the present disclosure detailed with reference to the drawings only involves selected embodiments of the present disclosure, without suggesting any limitation to the scope of the present disclosure. On the basis of the embodiments of the present disclosure, those skilled in the art could derive other embodiments, without doing creative work, which all fall into the protection scope of the present disclosure.

When browsing media contents, a user may notice that a presenting interface typically presents preview information of multiple media contents, where each piece of preview information is generally comprised of a title, a cover and partial text. If desiring to browse more information, the user needs to click on the preview information to enter the details interface, and then, if desiring to browse details of other media contents, the user has to exit the current details interface and click on other preview information. Such method is cumbersome and reduces the user's reading efficiency.

Based on the above research, the present disclosure provides a content publishing method and apparatus, a computer device and a storage medium provided by the embodiments of the present disclosure. In the case, a picture-text media content can be presented in real time based on an original picture edited by a user and target text; after the picture-text media content is sent to a server, the server can add the picture-text media content to the information stream data, so that the target client can present the text-picture media content in full screen after obtaining the information stream data. With the method, the user of the target client can directly implement picture-text media content switch by switching information stream data, thus simplifying the operation process; presenting pictures and words on a screen enables the picture-text media content to be presented to the user more intuitively, so as to improve the user's reading efficiency.

It is to be noted that similar references and alphabets represent similar terms in the drawings. Therefore, once a term is defined in one drawing, there is no need for further defining and explaining the same in the following drawings.

For the sake of understanding of these embodiments, detailed description will be made to the content publishing method according to embodiments of the present disclosure, where the performer of the content publishing method is generally a terminal device that may be, for example, a smart phone, a tablet computer, a personal computer, or the like. In some possible implementations, the content publishing method can be implemented by calling, by a processor, computer readable instructions stored in a memory.

FIG. 1 illustrates a flowchart of a content publishing method provided by embodiments of the present disclosure, including steps 101 through 104, where:

Step 101: obtaining, in response to an edit command, an original picture and target text;

Step 102: determining, based on size information of the original picture, a target presenting approach corresponding to the size information;

Step 103: processing the original picture based on the target presenting approach, and presenting a picture-text media content in real time based on a processed target picture, the target text, and the target presenting approach; and Step 104: sending, upon receiving a publishing command, the picture-text media content to a server to the server to add the picture-text media content to information stream data, and push the information stream data to a target client for presentation on a full-screen presenting interface of the target client, wherein the full-screen presenting interface is used to present a single media content in the information stream data.

Hereinafter, these steps will be described in detail:

For step 101:

The target text may include a title and text, for example.

Figure 2:
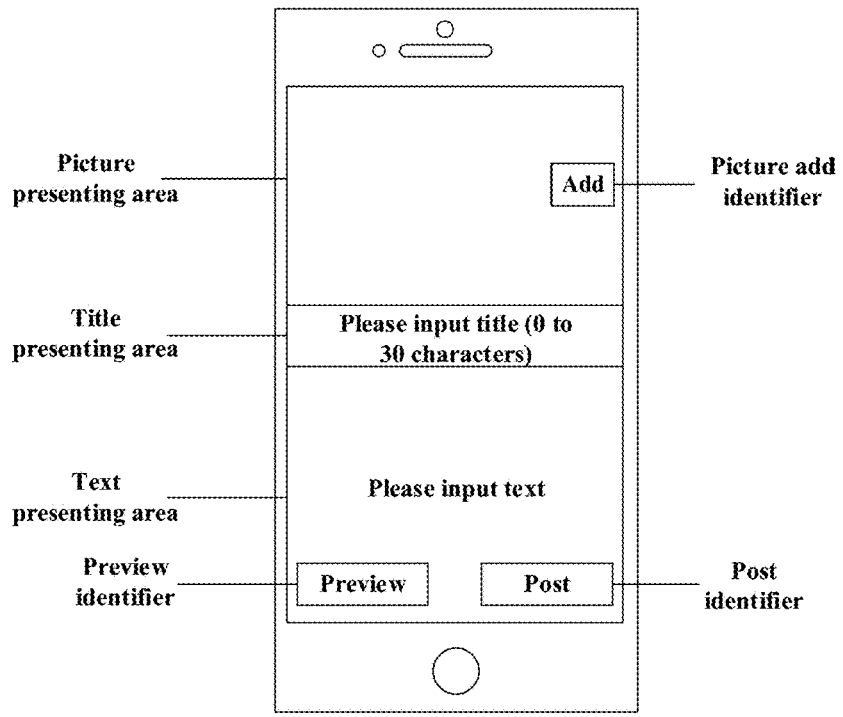
FIG. 2 illustrates a schematic diagram of a picture-text editing interface provided by embodiments of the present disclosure.

In a possible implementation, step 101 can be implemented via the picture-text editing interface as shown in FIG. 2, where the picture-text editing interface may include a picture presenting area, a picture adding identifier, a text presenting area and a title presenting area.

By way of example, in response to a trigger operation for the picture adding identifier or a trigger operation for the picture presenting area, the picture adding interface may be presented, which is used to determine a target picture; after the user determines the target picture, a confirm identifier can be triggered; in response to determining the trigger operation for the confirm identifier, the client can generate a first edit command for the target picture; in response to the first edit command, the target picture can be obtained.

Figure 3:
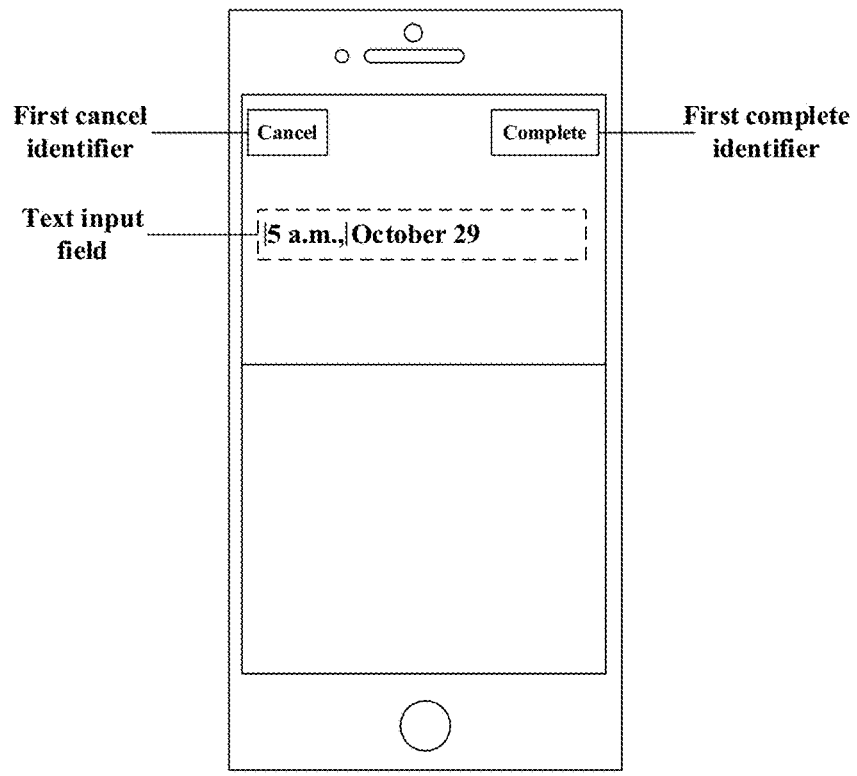
FIG. 3 illustrates a schematic diagram of a text input interface provided by embodiments of the present disclosure.

In response to the trigger operation for the text presenting area, text input by the user can be obtained, or the presenting may jump to the text input interface to present a text input field and a first complete identifier, as shown in FIG. 3, where the user can input text in the text input field; in response to a trigger operation for the first complete identifier, a second edit command carrying the text can be generated; the client can obtain the text after responding to the second edit command.

Figure 4:
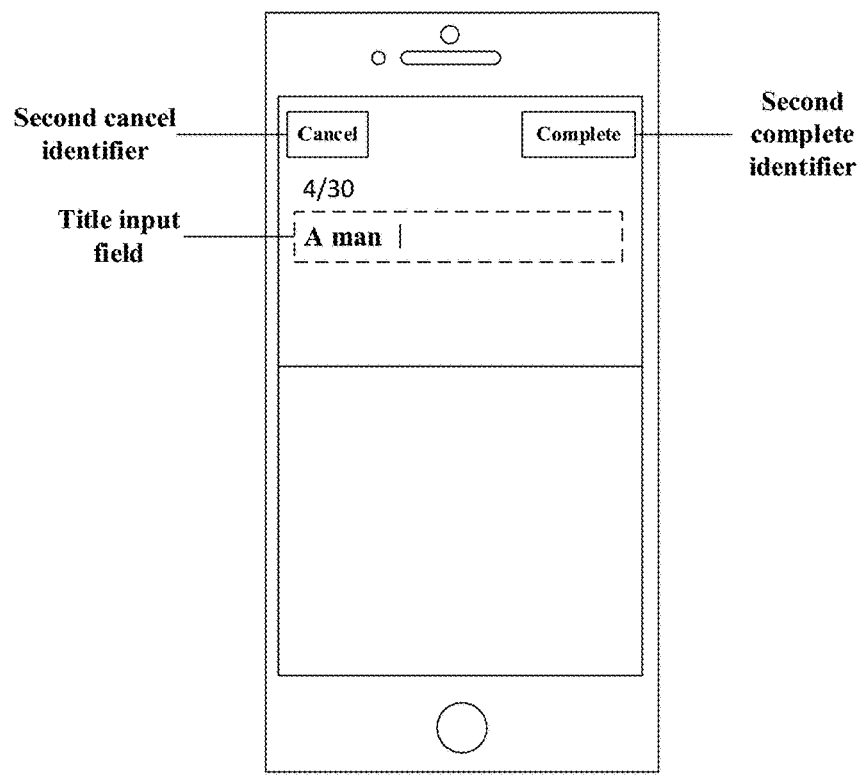
FIG. 4 illustrates a schematic diagram of a title input interface provided by embodiments of the present disclosure.

In response to a trigger operation for the title presenting area, a title input by the user can be obtained, or the presenting may jump to the title input interface to present a title input field and a second complete identifier, as shown in FIG. 4, where the user can input a title in the title input field; in response to a trigger operation for the second complete identifier, a third edit command carrying the title can be generated; the client can obtain the title after responding to the third edit command.

In a possible implementation, the text input interface may further include a first cancel identifier, and the title input interface may further include a second cancel identifier; in response to a trigger operation for the first cancel identifier or the second cancel identifier, the presenting may jump back to the picture-text editing interface.

For steps 102 and 103:

Specifically, the size information of the original picture may include a pixel size and an aspect ratio of the original picture. For example, the size information of the picture A may include 800×600 and 4:3. The client or the server has stored therein a correspondence relationship between the size information and a plurality of preset presenting approaches. After determining the size information, the size information can be stored in the memory where the correspondence relationship is stored, and determine a target presenting approach matching the size information.

In a possible implementation, the target presenting approach includes at least one of first presenting area information of the processed target picture, second presenting area information of the target text, a presenting size of the target picture, and image area information to be presented in the original picture.

Figure 5:
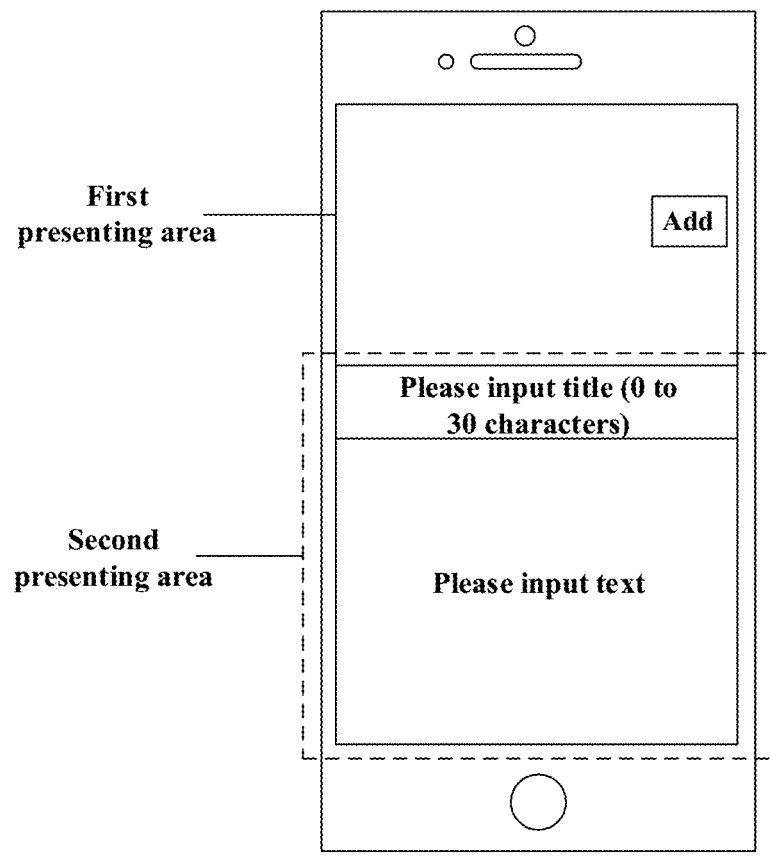
FIG. 5 illustrates a schematic diagram of a first presenting area and a second presenting area provided by embodiments of the present disclosure.

Herein, the first presenting area information may be, for example, range information of a first presenting area for presenting the target picture, the second presenting area information may be for example, range information of a second presenting area for presenting the target text, and image area information to be presented in the target picture may be, for example, range information of an image area for presenting the original picture wholly or in part. For example, if an author only desires to present a certain part of an original picture, the image area information may be range information of this part (i.e., the target picture), and the first presenting area and the second presenting area may be those shown in FIG. 5. According to the present disclosure, without being cropped, the original picture is presented wholly or in part based on the first presenting area information, so that the information of the target picture in the published content can be adjusted according to the poster's need, and the post also contains all the information of the original picture.

Hereinafter, the specific determining method of the target presenting approach will be described:

Specifically, the first presenting area information may include coordinates of four vertices of the first presenting area, for example, (10,20), (10,40), (30,20) and (30,40), or may include heights of upper and lower boundaries of the first presenting area, where the lower boundary has a height of 20, and the upper boundary has a height of 40, for example; likewise, the second presenting area information may be coordinates of four vertices of the second presenting area, or may be heights of upper and lower boundaries of the second presenting area; the image area information may be coordinates of four vertices of the image area to be presented in a coordinate system established based on the original picture, for example, pixel coordinates (10,100), (10,20), (60,100) and (60,20).

Figure 6A:
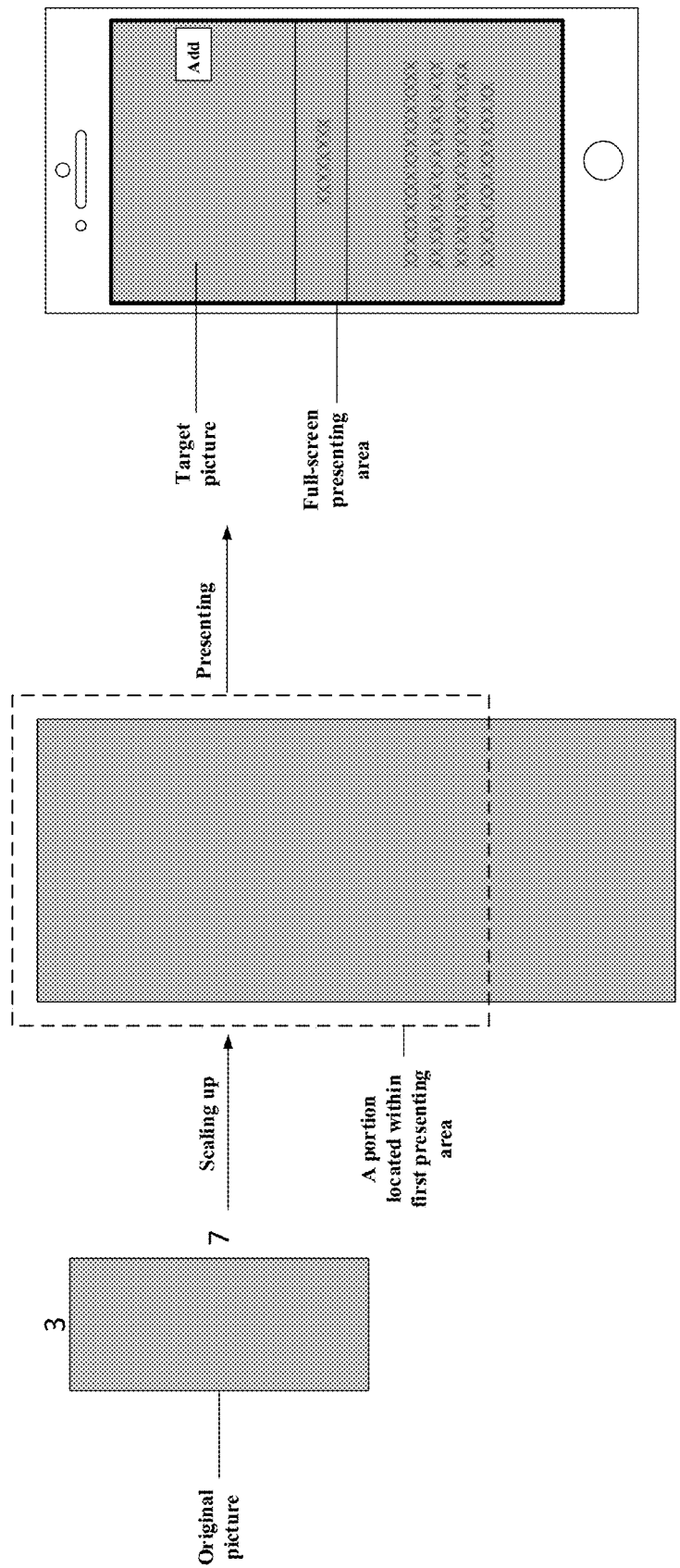
FIG. 6a illustrates a schematic diagram of a target picture with an aspect ratio less than a preset first ratio provided by embodiments of the present disclosure.

In a possible implementation, when processing the original image, the target presenting approaches corresponding to the different size information may include:

(1) As shown in FIG. 6a, when the aspect ratio of the original picture is less than a preset first ratio (e.g. 3:5), the first presenting area is a full-screen presenting area of the current interface (for different presenting devices, the full-screen presenting area is different), and the presenting size of the target picture when presented is identical to the size of the first presenting area.

Processing the original picture based on the target presenting approach may include scaling up or down the original picture according to the proportion of the original picture until the width is equal to the width of the first presenting area, or until the length is equal to the length of the first presenting area, and the portion located within the first presenting area is used as the target picture.

Figure 6B:
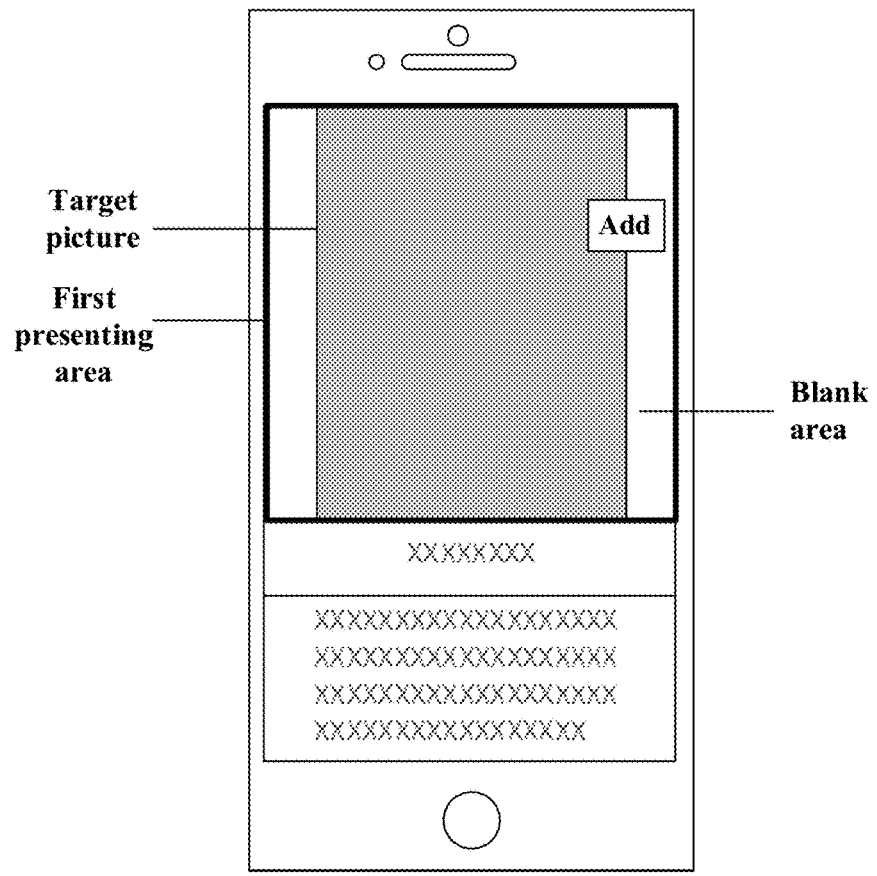
FIG. 6b illustrates a schematic diagram of a target picture with an aspect ratio not less than the first ratio but less than a preset ratio provided by embodiments of the present disclosure.

(2) As shown in FIG. 6b, when the aspect ratio of the original picture is not less than the first ratio but less than a preset ratio (e.g. not less than 3:5 but less than 3:4), the size (i.e., first presenting area information) of the first presenting area may be a size of a preset first container (e.g. a container with an aspect ratio of 3:4), where the aspect ratio of the preset first container may be the second ratio, for example.

Processing the original picture based on the target presenting approach may include: determining a maximum presenting size of the original picture with an aspect ratio of 1:1 in the case of not extending beyond the first presenting area; scaling up or down the original picture to the maximum presenting size, according to the proportion of the original picture, to obtain the target picture; and presenting the target picture in the first presenting area.

Here, after the original picture is scaled up or down to the maximum presenting size, according to the proportion of the original picture, the obtained target picture has a length the same as the length of the first presenting area, or the obtained target picture has a width the same as the width of the first presenting area.

In a possible implementation, after the original picture is scaled up or down, the size of the first presenting area is greater than the size of the target picture, and the first presenting area includes an unoccupied blank area in addition to the first presenting area. In the case, the blank area may present a preset first target background color, or a second target background color corresponding to the target picture color. By way of example, the first target background color may be a preset color, for example, black; the second target background color may be determined based on the color of the target picture (which may be a color corresponding to a mean of pixel values of respective pixel points of the target picture), which includes, for example, detecting the overall tone of the target picture, and determining, based on the preset color correspondence relationship, a color matching the overall tone to fill the blank area.

Figure 6C:
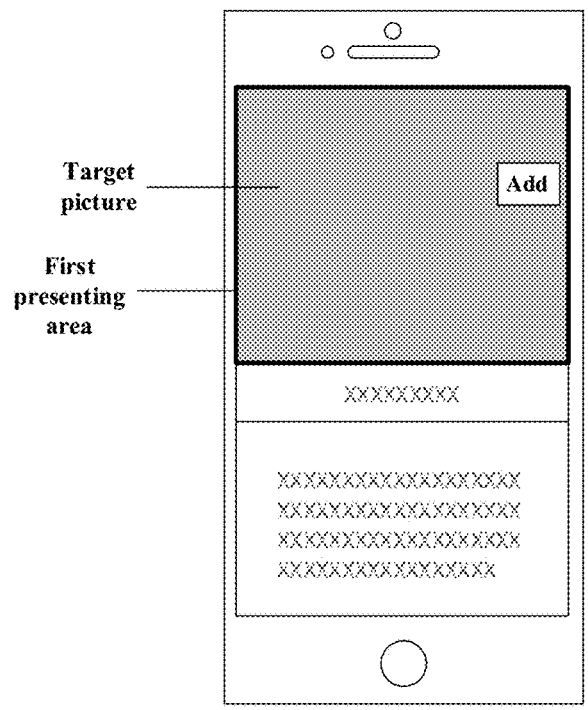
FIG. 6c illustrates a schematic diagram of a target picture with an aspect ratio not less than the second ratio but less than a preset ratio provided by embodiments of the present disclosure.

(3) As shown in FIG. 6c, when the aspect ratio of the target picture is not less than second ratio but less than a preset third ratio (e.g., not less than 3:4 but less than 4:3), the aspect ratio of the first presenting area is equal to the aspect ratio of the original picture. When determining the size of the first presenting area, the maximum presenting size of the original picture with the aspect ratio of 1:1 may be used as the size of the first presenting area in the case of not extending beyond the full-screen presenting area.

Processing the original picture based on the target presenting approach may include: scaling up or down the original picture to the size of the first presenting area, according to the aspect ratio of the original picture, to obtain the target picture, and presenting the target picture in the first presenting area.

In the case, the presenting size of the target picture is identical to the size of the first presenting area.

Figure 6D:
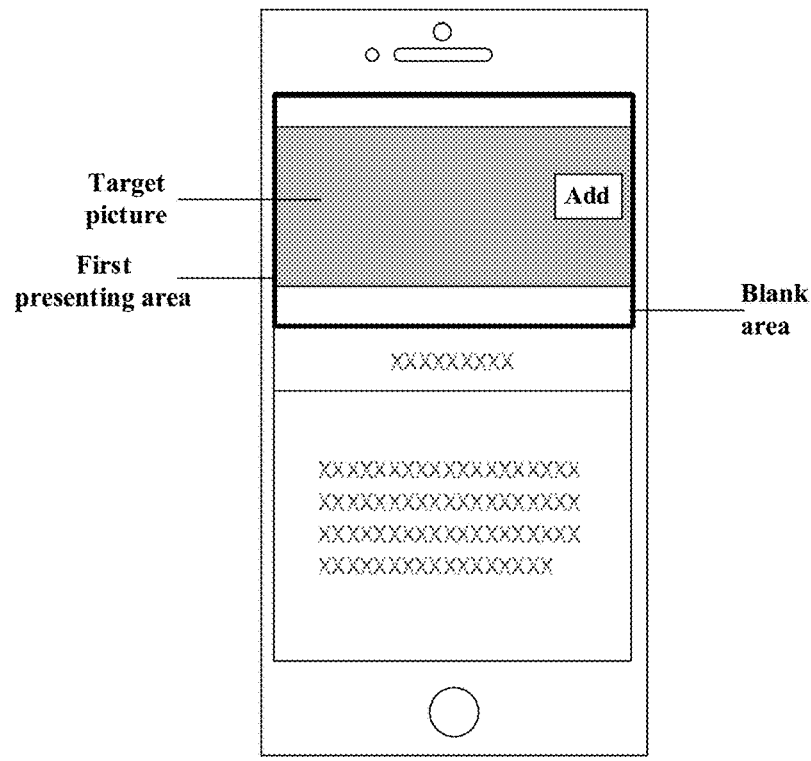
FIG. 6d illustrates a schematic diagram of a target picture with an aspect ratio not less than the third ratio provided by embodiments of the present disclosure.

(4) As shown in FIG. 6d, when the aspect ratio of the original picture is not less than the third ratio (e.g., not less than 4:3), the size of the first presenting area may be a size of a preset second container (e.g., a container with an aspect ratio of 4:3), where the aspect ratio of the preset container may be the third ratio, for example.

Processing the original picture based on the target presenting approach may include: determining a maximum presenting size of the original picture with an aspect ratio of 1:1 in the case of not extending beyond the first presenting area; scaling up or down the original picture to the maximum presenting size, according to the proportion of the original picture, to obtain the target picture; and presenting the target picture in the first presenting area.

Likewise, in a possible implementation, when the first presenting area includes an unoccupied blank area in addition to the target picture, the processing method for the blank area is the same as the one described above in (2), details of which are omitted here for brevity.

In a possible implementation, the second presenting area information can be determined based on the first presenting area information and a height of the target text. By way of example, the second presenting area may be located below the first presenting area. For example, the height of the upper boundary (or ordinates of two vertices of the upper boundary) of the second presenting area may be the height of the lower boundary of the first presenting area minus 10 pixel points.

The height of the second presenting area can be determined based on a number of rows of the target text. For example, a different height can be set for the target text with a different font, a number of rows of the target text with the different height is counted, a height of the second presenting area is computed, and the height of the lower boundary (or ordinates of two vertices of the lower boundary) of the second presenting area is determined based on the height of the upper boundary (or ordinates of two vertices of the upper boundary) of the second presenting area.

In a possible implementation, when a sum of the height of the first presenting area and the height of the target text is greater than a preset maximum height, the height of the second presenting area is a difference between the preset maximum height and the height of the first presenting area, where the second presenting area presents only a part of the target text, and an expand identifier; after detecting a trigger operation for the expand identifier, the presenting may jump to the text presenting interface, and the full target text are presented.

In a possible implementation, if the obtained original picture includes a plurality of pictures, determining, based on the size information of the original picture, the target presenting approach corresponding to the size information includes: determining a presenting approach of the plurality of pictures, the presenting approach comprising a sequential presenting, or a tile presenting; and determining, based on size information of the plurality of pictures, the target presenting approach corresponding to the size information and the presenting approach.

Specifically, an example of the sequential presenting may be: sequentially presenting a plurality of target pictures in the first presenting area according to a preset time interval (e.g. 0.5 seconds) and a preset presenting sequence, where the preset time interval and the preset presenting sequence may be modified by a user, the preset time interval may be a preset default time before being adjusted by the user, and the preset presenting sequence may be a sequence of obtaining the plurality of pictures (e.g., a sequence of uploading, by a user, the pictures).

The tile presenting is presenting simultaneously a plurality of target pictures in a preset picture presenting template, where the picture presenting template includes a plurality of picture presenting containers each of which can present a target picture.

The specific implementations of the two presenting approaches will be described below:

In a possible implementation, in the case where the presenting approach is the sequential presenting, determining, based on the size information of the plurality of pictures, the target presenting approach corresponding to the size information and the presenting approach may include determining the target presenting approach based on size information of a first picture in the plurality of pictures.

Herein, the first picture may be an original picture obtained first (e.g., an original picture first uploaded by the user), or the original picture may be modified by the user.

By way of example, in response to a trigger operation for the first presenting area, a sequence adjusting interface can be presented, where a plurality of pictures is presented according to the presenting sequence, and the presenting sequence of the plurality of pictures can be adjusted in response to a user's target trigger operation (e.g. drag, long press, slide, click, or double-click).

In a possible implementation, in response to the original picture including a plurality of pictures, determining the target presenting approach based on the size information of the first picture in the plurality of pictures may include: determining, based on the size information of the first picture, a first presenting approach matching the first picture in the target presenting approach; and determining a second presenting approach of other pictures than the first picture based on a container size matching a presenting size of the first picture, and size information of the other pictures, in the first presenting approach.

Here, the container matching the presenting size of the first picture may be a container containing the first presenting area of the first picture, or may be a container having the same size as the first presenting area.

Figure 7A:
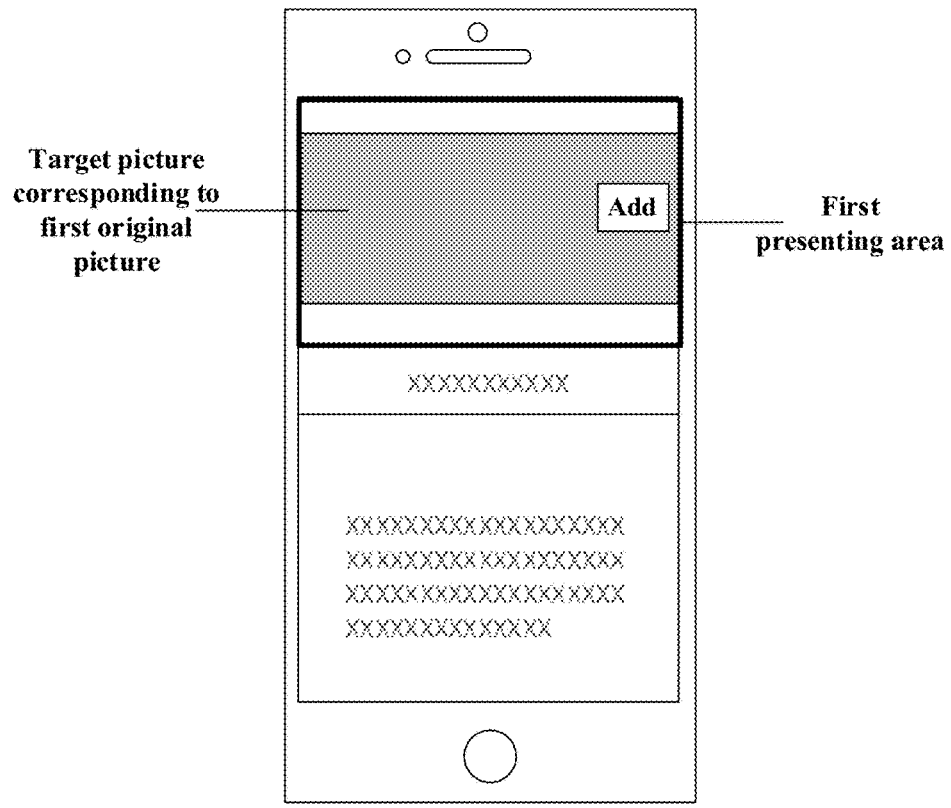
FIG. 7a illustrates a schematic diagram of a target picture corresponding to a first original picture provided by embodiments of the present disclosure.
Figure 7B:
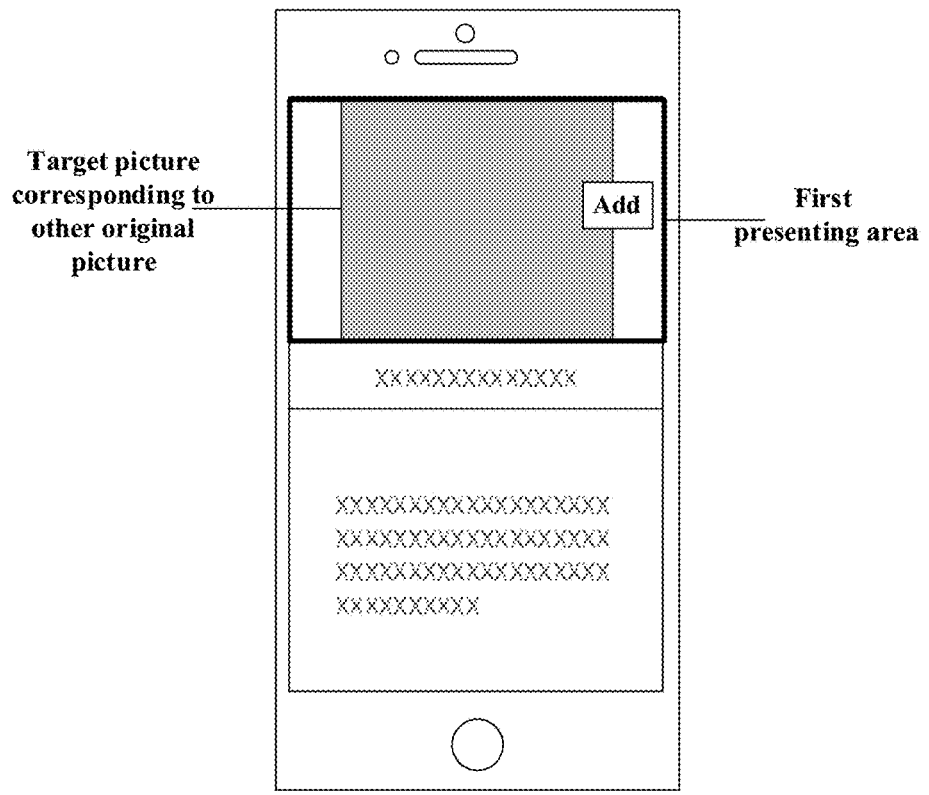
FIG. 7b illustrates a schematic diagram of a target picture corresponding to another original picture provided by embodiments of the present disclosure.

Specifically, when determining the second presenting approach, all the pictures can be presented in the same container by means of the second presenting approach, in order to improve the visual effect when the user views the target pictures. By way of example, as shown in FIG. 7*a*, the size of the container of the first picture can be first determined (the presenting area corresponding to the container of the first picture is the first presenting area). Then, as shown in FIG. 7*b*, the container is used as the container of the other pictures; without modifying the aspect ratios of the other pictures, the other pictures are scaled up or down within the container to a size not greater than the size of the container of the original picture, according to the original ratios, to obtain target pictures corresponding to the other pictures; and the target pictures corresponding to the other pictures are presented in the container.

Figure 8:
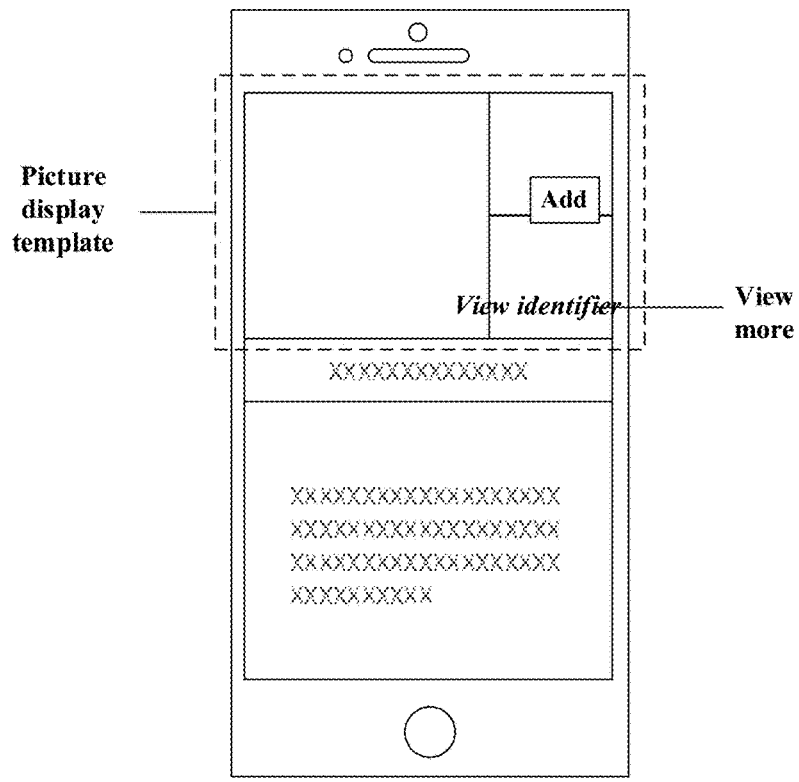
FIG. 8 illustrates a schematic diagram of a tile presenting of target pictures provided by embodiments of the present disclosure.

In a possible implementation, in response to the presenting approach being the tile presenting, determining, based on the size information of the plurality of pictures, the target presenting approach corresponding to the size information and the presenting approach includes: as shown in FIG. 8, determining a picture presenting template matching a number of the plurality of pictures, the picture presenting template comprising a presenting position and a presenting size of at least one picture; and determining the target presenting approach based on the size information of the plurality of pictures, and the presenting size in the picture presenting template.

For example, the target presenting approach may be determined based on the size information of each picture (i.e., all the original pictures) in the plurality of pictures and the presenting size in the picture presenting template.

Specifically, the database may store a plurality of picture presenting templates differing in presenting number, where each picture presenting template includes a plurality of corresponding presenting positions, and presenting sizes corresponding to the presenting positions. Determining the presenting template may include: determining a number of the pictures, and determining a picture presenting template having a presenting number identical to the number of the pictures.

If a number of the target pictures (i.e., a number of the pictures) is greater than the maximum presenting number of the first presenting template (e.g. the template includes at most 9 original pictures), the first presenting template may be used as the picture presenting template matching the number of the plurality of pictures. The presenting number of target pictures corresponding to the first presenting template can be presented on the first presenting template; the target pictures can be selected manually by the user, or selected according to an upload sequence of the plurality of pictures; first N (i.e., a number of containers on the first presenting template) target pictures are used as the presented target pictures.

If the number of the target pictures (i.e., the number of the plurality of pictures) is less than that of the second presenting template having the smallest presenting number, the plurality of target pictures can be presented randomly at a plurality of presenting positions and presented according to the presenting sizes matching the presenting positions, or can be presented sequentially at first M (i.e., the number of the plurality of pictures) presenting positions according to a preset priority sequence of the presenting positions.

After determining the presenting template, an image area to be presented, namely the target picture, in the original picture is determined, and the target picture is then determined at the presenting position. Here, the image area to be presented in the original picture can be adjusted on the picture editing interface. After determining the presenting template, the image area to be presented in the original pictures can be determined automatically based on the presenting size corresponding to the target picture, and the preset target position. By way of example, the preset target position may be a center area of the original picture.

In a possible implementation, in response to a trigger operation for the plurality of target pictures, or in response to a trigger operation for the editing identifier, the presenting can jump to the picture editing interface where the presenting size of the original picture and the image area information to be presented can be adjusted.

Figure 9:
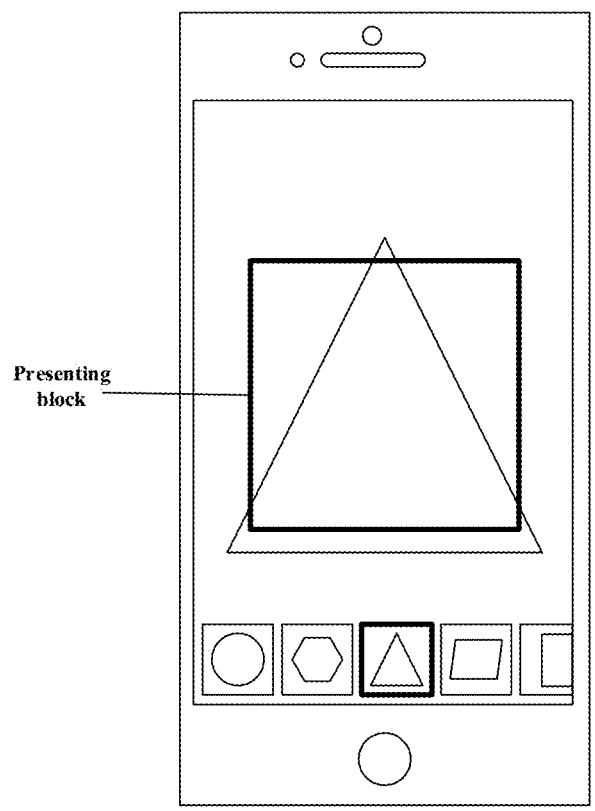
FIG. 9 illustrates a schematic diagram of a picture editing interface provided by embodiments of the present disclosure.

By way of example, as shown in FIG. 9, a plurality of original pictures is presented on the picture editing interface; in response to a trigger operation for any one of the original pictures, the original picture can be presented in a preset adjusting area that includes a presenting block corresponding to the original picture, where a portion located within the presenting block is a portion for presentation; a user can adjust the size and the position of the original picture through the target trigger operation, determine an image area to be presented, determine the part of image located within the presenting block as the target picture in response to a trigger operation for the complete identifier, and return to the picture-text editing interface for presentation.

In a possible implementation, in response to an adjusting operation for the original picture and/or the target text, the original picture and/or the target text are adjusted; after performing adjusting, a third presenting approach corresponding to size information of the adjusted original picture is determined; processing the original picture based on the target presenting approach includes processing, based on the third presenting approach, the adjusted original picture.

Specifically, the adjusting operation includes, but is not limited to, click, double click, slide, and drag. The adjusting processing may include adjusting the target text and the target picture. By way of example, the adjusting processing may include: adjusting the size information of the original pictures, adjusting the number of the original pictures, editing the target text, adjusting the size and the font of the target text, and the like. The adjusted original picture is used to represent an original image after the adjusting processing.

Here, the method of determining the third presenting approach is identical to the one of determining the target presenting approach, and the method of processing the adjusted original pictures based on the third presenting approach is identical to the one of processing the original pictures based on the target presenting approach. Details thereof are omitted here for brevity.

In a possible implementation, as shown in FIG. 2, the picture-text editing interface further includes a preview identifier. In response to a trigger operation for the preview identifier, the presenting jumps to a preview interface, and a picture-text media content generated after processing according to the current presenting approach is presented on the preview interface.

For step 104:

By way of example, as shown in FIG. 2, the publishing command may be generated in response to a trigger operation for a post identifier for the picture-text editing interface.

In a possible implementation, in response to a trigger operation for a target picture in the full-screen presenting interface, an original picture corresponding to the target picture, or a target picture scaled up according to a preset ratio, can be presented.

In a possible implementation, in the case where the full-screen presenting interface only presents the target picture corresponding to a part of the original picture, as shown in FIG. 8, the full-screen presenting interface further includes a view identifier (e.g. "view more"), and the whole original picture is presented in response to a trigger operation for the view identifier.

In a possible implementation, if the user does not upload a target picture but only inputs target text, the target text can be obtained in response to an edit command; the picture-text media content can be generated based on the target text; upon receiving the publishing command, the picture-text media content can be sent to the server.

In a possible implementation, when the height of the media content is less than the preset maximum height, the media content is presented in the vertical center of the full-screen presenting interface.

According to the content publishing method provided by the embodiments of the present disclosure, a picture-text media content can be presented in real time based on an original picture edited by a user and target text; after the picture-text media content is sent to a server, the server can add the picture-text media content to the information stream data, so that the target client can present the text-picture media content in full screen after obtaining the information stream data. With the method, the user of the target client can directly implement picture-text media content switch by switching information stream data, thus simplifying the operation process; presenting pictures and words on a screen enables the picture-text media content to be presented to the user more intuitively, thereby improving the user's reading efficiency.

It would be appreciated by those skilled in the art that, in the above method according to the implementations, the order of the respective steps, which is not a strict execution order, does not formulate any limitation to the implementation process, and the specific execution order of the respective steps should be determined depending on the functions and the possible internal logic thereof.

Based on the same invention conception, the embodiments of the present disclosure further provide a content publishing apparatus corresponding to the content publishing method. Since the apparatus according to the embodiments of the present disclosure is similar to the content publishing method described above in terms of the principle for solving the problem, see the implementation of the method for details which are omitted here for brevity.

Figure 10:
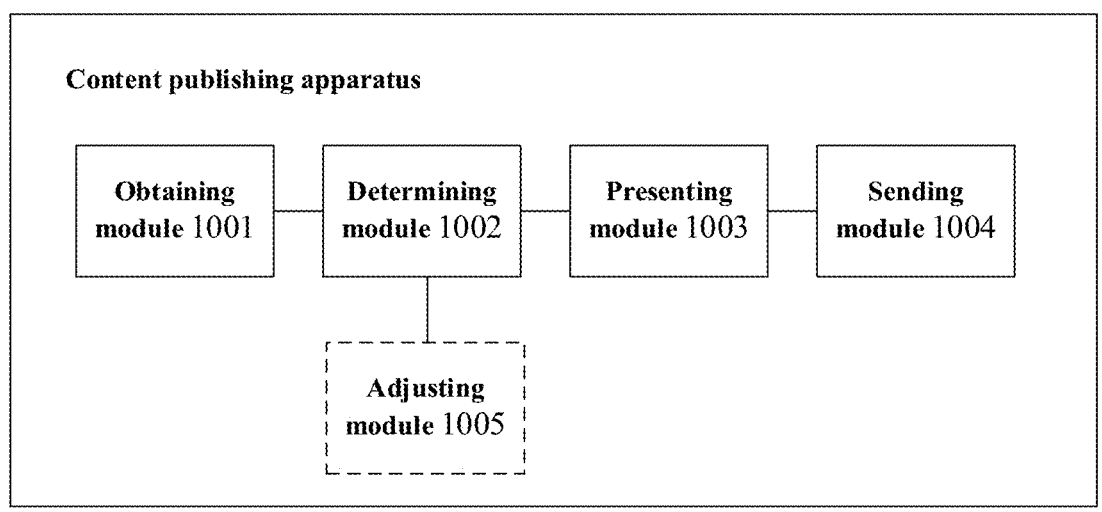
FIG. 10 illustrates a schematic diagram of an architecture of a content publishing apparatus provided by embodiments of the present disclosure.

FIG. 10 illustrates a schematic diagram of an architecture of a content publishing apparatus provided by embodiments of the present disclosure. The apparatus includes: an obtaining module 1001, a determining module 1002, a presenting module 1003, a sending module 1004, and an adjusting module 1005, where:

the obtaining module 1001 for obtaining an original picture and target text, in response to an edit command;

the determining module 1002 for determining, based on size information of the original picture, a target presenting approach corresponding to the size information;

the presenting module 1003 for processing the original picture based on the target presenting approach, and presenting a picture-text media content in real time based on a processed target picture, the target text, and the target presenting approach; and the sending module 1004 for, upon receiving a publishing command, sending the picture-text media content to a server to cause the server to add the picture-text media content to information stream data, and push the information stream data to a target client for presentation on a full-screen presenting interface of the target client, wherein the full-screen presenting interface is used to present a single media content in the information stream data.

In a possible implementation, the target presenting approach comprises at least one of first presenting area information of the processed target picture, second presenting area information of the target text, a presenting size of the target picture, and image area information to be presented in the original picture.

In a possible implementation, in a case where the obtained original picture comprises a plurality of pictures, when determining, based on the size information of the original picture, the target presenting approach corresponding to the size information, the determining module 1002 is configured for:

determining a presenting approach of the plurality of pictures, the presenting approach comprising a sequential presenting, or a tile presenting; and determining, based on size information of the plurality of pictures, the target presenting approach corresponding to the size information and the presenting approach.

In a possible implementation, in a case where the presenting approach is the sequential presenting, when determining, based on the size information of the plurality of pictures, the target presenting approach corresponding to the size information and the presenting approach, the determining module 1002 is configured for:

determining the target presenting approach based on size information of a first picture in the plurality of pictures.

In a possible implementation, when determining the target presenting approach based on the size information of the first picture in the plurality of pictures, the determining module 1002 is configured for:

determining, based on the size information of the first picture, a first presenting approach matching the first picture in the target presenting approach; and determining a second presenting approach of other pictures than the first picture based on a container size matching a presenting size of the first picture, and size information of the other pictures, in the first presenting approach.

In a possible implementation, in a case where the presenting approach is the tile presenting, when determining, based on the size information of the plurality of pictures, the target presenting approach corresponding to the size information and the presenting approach, the determining module 1002 is configured for:

determining a picture presenting template matching a number of the plurality of pictures, the picture presenting template comprising a presenting position and a presenting size of at least one picture; and determining the target presenting approach based on the size information of the plurality of pictures, and the presenting size in the picture presenting template.

In a possible implementation, the sending module 1004 is further configured for:

in response to the edit command, obtaining the target text;

generating the picture-text media content based on the target text; and upon receiving the publishing command, sending the picture-text media content to the server.

In a possible implementation, the apparatus further comprises:

an adjusting module 1005 for adjusting the original picture and/or the target text in response to an adjusting operation for the original picture and/or the target text;

the determining module 1002 further configured for, after performing adjusting, determining a third presenting approach corresponding to size information of the adjusted original picture;

when processing the original picture based on the target presenting approach, the presenting module 1003 is configured for:

processing, based on the third presenting approach, the adjusted original picture.

For the processing flow of respective modules in the apparatus, and the interaction between the respective modules, see the related description in the method embodiments for details which are omitted here for brevity.

Figure 11:
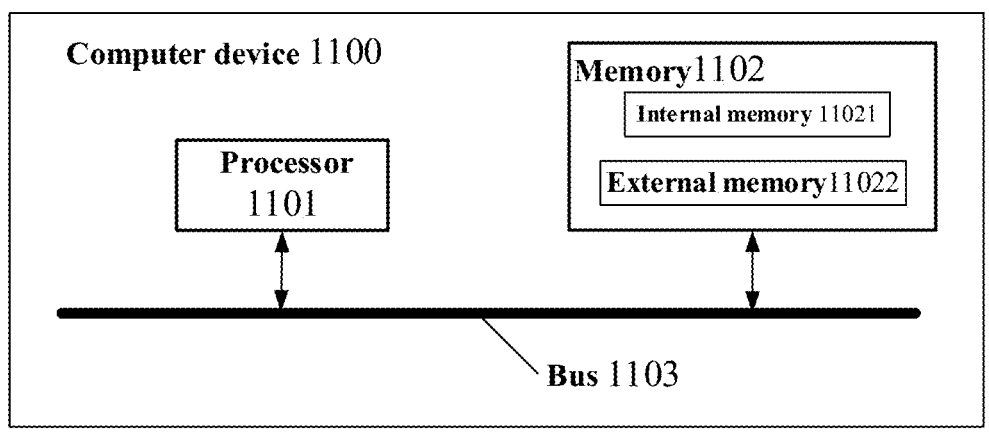
FIG. 11 illustrates a schematic diagram of a structure of a computer device provided by embodiments of the present disclosure.

On the basis of the same technical conception, the embodiments of the present disclosure provide a computer device. FIG. 11 illustrates a schematic diagram of a structure of a computer device 1100 provided by embodiments of the present disclosure, which includes a processor 1100, a memory 1102 and a bus 1103, where the memory 1102 is configured to store executable instructions and includes an internal memory 11021 and an external memory 11022. Here, the internal memory 11021 is also referred to as internal storage unit for temporarily storing operation data in the processor 1101 and data to be exchanged with the external memory 11022 such as a hard disk or the like. The processor 1101 can exchange data with the external memory 11022 via the internal memory 11021. When the computer device 1100 is running, the processor 1101 and the memory 1102 communicate with each other via the bus 1103, to cause the processor 1101 to execute instructions of:

in response to an edit command, obtaining an original picture and target text;

determining, based on size information of the original picture, a target presenting approach corresponding to the size information;

processing the original picture based on the target presenting approach, and presenting a picture-text media content in real time based on a processed target picture, the target text, and the target presenting approach; and upon receiving a publishing command, sending the picture-text media content to a server, so that the server adds the picture-text media content to information stream data, and pushes the information stream data to a target client, to present the same on a full-screen presenting interface of the target client, wherein the full-screen presenting interface is used to present a single media content in the information stream data.

In a possible implementation, in the instructions executed by the processor 1101, the target presenting approach comprises at least one of first presenting area information of the processed target picture, second presenting area information of the target text, a presenting size of the target picture, and image area information to be presented in the original picture.

In a possible implementation, in the instructions executed by the processor 1101, in a case where the obtained original picture comprises a plurality of pictures, determining, based on the size information of the original picture, the target presenting approach corresponding to the size information comprises:

determining a presenting approach of the plurality of pictures, the presenting approach comprising a sequential presenting, or a tile presenting; and determining, based on size information of the plurality of pictures, the target presenting approach corresponding to the size information and the presenting approach.

In a possible implementation, in the instructions executed by the processor 1101, in a case where the presenting approach is the sequential presenting, determining, based on the size information of the plurality of pictures, the target presenting approach corresponding to the size information and the presenting approach comprises:

determining the target presenting approach based on size information of a first picture in the plurality of pictures.

In a possible implementation, in the instructions executed by the processor 1101, determining the target presenting approach based on the size information of the first picture in the plurality of pictures comprises:

determining, based on the size information of the first picture, a first presenting approach matching the first picture in the target presenting approach; and determining a second presenting approach of other pictures than the first picture based on a container size matching a presenting size of the first picture, and size information of the other pictures, in the first presenting approach.

In a possible implementation, in the instructions executed by the processor 1101, in a case where the presenting approach is the tile presenting, determining, based on the size information of the plurality of pictures, the target presenting approach corresponding to the size information and the presenting approach comprises:

determining a picture presenting template matching a number of the plurality of pictures, the picture presenting template comprising a presenting position and a presenting size of at least one picture; and determining the target presenting approach based on the size information of the plurality of pictures, and the presenting size in the picture presenting template.

In a possible implementation, in the instructions executed by the processor 1101, the method further comprises:

in response to the edit command, obtaining the target text;

generating the picture-text media content based on the target text; and upon receiving the publishing command, sending the picture-text media content to the server.

In a possible implementation, in the instructions executed by the processor 1101, the method further comprises:

in response to an adjusting operation for the original picture and/or the target text, adjusting the original picture and/or the target text;

after performing adjusting, determining a third presenting approach corresponding to size information of the adjusted original picture;

processing the original picture based on the target presenting approach, comprises:

processing, based on the third presenting approach, the adjusted original picture.

The embodiments of the present disclosure further provide a computer readable storage programs stored thereon, where the computer programs, when executed by a processor, perform the steps of the content publishing method according to the method embodiments described above. Wherein, the storage medium may be a volatile or non-volatile computer readable storage medium.

The embodiments of the present disclosure still further provide a computer program product having program code carried thereon, where the instructions included in the program code can be used to perform steps of the content publishing method according to the method embodiments described above. See the method embodiments described above for details which are omitted here for brevity.

The computer program product may be implemented by hardware, software or a combination thereof. In an alternative embodiment, the computer program product is instantiated as a computer storage medium. In a further alternative embodiment, the computer program product is instantiated as a software product, for example, a Software Development Kit (SDK) and the like.

As would be fully understood by those skilled in the art, reference could be made to the corresponding process described in the above method embodiments for details of the specific operation process of the system and apparatus, which are omitted here for ease and brevity of the description. In some embodiments provided by the present disclosure, it would be appreciated that the system, apparatus and method disclosed herein could be implemented in other fashion. The apparatus embodiments described above are provided only exemplarily. For example, the division of the units is only a logical function division, which may be a further type of division when implemented in practice. For another example, a plurality of units or components may be combined or may be integrated in a further system, or some features may be omitted or may not be executed. In addition, coupling or direct coupling, or a communication connection, between the components shown or discussed may be implemented via some communication interfaces, and indirect coupling, or a communication connection, may be in an electrical or mechanical form, or other form.

The units described as separate components may, or may not, be physically separated, and components presented as units may, or may not, be physical units (i.e., they may be located on the same site, or may be distributed over a plurality of network units). Some or all of the units may be chosen, as actually required, to accomplish the objective of the solution according to the embodiments.

In addition, the respective functional units in the embodiments of the present disclosure may be integrated in a processing unit, or the respective units may exist physically separately, or two or more units may be integrated in one unit.

If implemented in the form of software functional units and sold or used as a stand-alone product, the functions could be stored in a non-volatile computer readable storage medium executable by a processor. According to this understanding, the substance of the technical solution according to the present disclosure, or the part thereof making contribution over the prior art or parts of the technical solution, may be embodied in the form of software product, where the computer software product is stored in a storage medium and includes a plurality of instructions to cause a computer device (which may be a personal computer, server, network device, or the like) to perform all or a part of steps of the method according to the embodiments of the present disclosure. The storage medium as described above includes: a U disk, a mobile hard disk, a Read-Only Memory (ROM), a Random Access Memory (RAM), a magnetic or optical disk, and other medium that can store program code.

It should be noted that the above embodiments, only as specific implementations of the present disclosure, are employed to describe the technical solution of the present disclosure, rather than limit the latter, and the protection scope of the present disclosure is not limited thereto. Although the present disclosure has been detailed with reference to the above embodiments, the ordinary skilled in the art would understand that, within the technical range disclosed herein, any one skilled in the art is further allowed to modify the technical solution as recited in the above embodiments, or may easily envision changing the technical solution or making equivalent substitutions for some technical features therein. However, those modifications, changes or substitutions do not cause the substance of the corresponding technical solution to depart from the spirits or scope of the technical solution according to the embodiments of the present disclosure, and should all be covered in the protection scope of the present disclosure. Therefore, the protection scope of the present disclosure should be determined depending on the appended claims.

The invention claimed is:

1. A content publishing method, comprising:
obtaining, in response to an edit command, an original picture and target text;
determining, based on size information of the original picture, a target presenting approach corresponding to the size information of the original picture;
processing the original picture based on the target presenting approach, and presenting a picture-text media content in real time based on a processed target picture, the target text, and the target presenting approach; and
sending, upon receiving a publishing command, the picture-text media content to a server to cause the server to add the picture-text media content to information stream data and push the information stream data to a target client, and for presentation on a full-screen presenting interface of the target client, wherein the full-screen presenting interface is used to present a single media content in the information stream data, wherein
in response to the obtained original picture comprising a plurality of pictures, determining, based on the size information of the original picture, the target presenting approach corresponding to the size information of the original picture comprises:
determining a presenting approach of the plurality of pictures, the presenting approach comprising a sequential presenting, or a tile presenting; and
determining, based on size information of the plurality of pictures, the target presenting approach corresponding to the size information of the original picture and the presenting approach,
in response to the presenting approach being the sequential presenting, determining, based on the size information of the plurality of pictures, the target presenting approach corresponding to the size information of the original picture and the presenting approach comprises:
determining, based on size information of a first picture in the plurality of pictures, a first presenting approach matching the first picture in the target presenting approach; and
determining a second presenting approach of other pictures than the first picture based on a container size matching a presenting size of the first picture, and size information of the other pictures, in the first presenting approach, wherein a container of the first picture has a same size as the presenting size of the first picture and the container of the first picture is used as a container of the other pictures without modifying aspect ratios of the other pictures in the second presenting approach, and
the size information of the original picture comprises a pixel size and an aspect ratio of the original picture.

2. The method of claim 1, wherein the target presenting approach comprises at least one of first presenting area information of the processed target picture, second presenting area information of the target text, a presenting size of the target picture, and image area information to be presented in the original picture.

3. The method of claim 1, wherein, in response to the presenting approach being the tile presenting, determining, based on the size information of the plurality of pictures, the target presenting approach corresponding to the size information of the original picture and the presenting approach comprises:
   determining a picture presenting template matching a number of the plurality of pictures, the picture presenting template comprising a presenting position and a presenting size of at least one picture; and
   determining the target presenting approach based on the size information of the plurality of pictures, and the presenting size in the picture presenting template.

4. The method of claim 1, further comprising:
   in response to the edit command, obtaining the target text;
   generating the picture-text media content based on the target text; and
   sending, upon receiving the publishing command, the picture-text media content to the server.

5. The method of claim 1, further comprising:
   in response to an adjusting operation for at least one of: the original picture or the target text, adjusting at least one of: the original picture or the target text; and
   determining, upon performing adjusting, a third presenting approach corresponding to size information of the adjusted original picture, wherein
   processing the original picture based on the target presenting approach, comprises:
      processing, based on the third presenting approach, the adjusted original picture.

6. The method of claim 1, wherein in the second presenting approach, the other pictures are scaled up or down within the container to a size not greater than a container size of the original picture, according to original ratios, to obtain target pictures corresponding to the other pictures, and the target pictures corresponding to the other pictures are presented in the container.

7. A computer device, comprising: a processor, a memory and a bus, wherein the memory stores machine readable instructions executable by the processor, and wherein when the computer device is running, the processor and the memory communicate with each other via the bus, and the machine readable instructions, when executed by the processor, cause the processor to:
   obtain, in response to an edit command, an original picture and target text;
   determine, based on size information of the original picture, a target presenting approach corresponding to the size information of the original picture;
   process the original picture based on the target presenting approach, and presenting a picture-text media content in real time based on a processed target picture, the target text, and the target presenting approach; and
   send, upon receiving a publishing command, the picture-text media content to a server to cause the server to add the picture-text media content to information stream data and push the information stream data to a target client, and for presentation on a full-screen presenting interface of the target client, wherein the full-screen presenting interface is used to present a single media content in the information stream data,
   wherein in response to the obtained original picture comprising a plurality of pictures, to determine, based on the size information of the original picture, the target presenting approach corresponding to the size information of the original picture, the machine readable instructions cause the processor to:
      determine a presenting approach of the plurality of pictures, the presenting approach comprising a sequential presenting, or a tile presenting; and
      determine, based on size information of the plurality of pictures, the target presenting approach corresponding to the size information of the original picture and the presenting approach,
   wherein in response to the presenting approach being the sequential presenting, to determine, based on the size information of the plurality of pictures, the target presenting approach corresponding to the size information of the original picture and the presenting approach, the machine readable instructions cause the processor to:
      determine, based on size information of a first picture in the plurality of pictures, a first presenting approach matching the first picture in the target presenting approach; and
      determine a second presenting approach of other pictures than the first picture based on a container size matching a presenting size of the first picture, and size information of the other pictures, in the first presenting approach, wherein a container of the first picture has a same size as the presenting size of the first picture and the container of the first picture is used as a container of the other pictures without modifying aspect ratios of the other pictures in the second presenting approach, and
   wherein the size information of the original picture comprises a pixel size and an aspect ratio of the original picture.

8. The computer device of claim 7, wherein in the second presenting approach, the other pictures are scaled up or down within the container to a size not greater than a container size of the original picture, according to original ratios, to obtain target pictures corresponding to the other pictures, and the target pictures corresponding to the other pictures are presented in the container.

9. The computer device of claim 7, wherein the target presenting approach comprises at least one of first presenting area information of the processed target picture, second presenting area information of the target text, a presenting size of the target picture, and image area information to be presented in the original picture.

10. The computer device of claim 7, wherein in response to the presenting approach being the tile presenting, to determine, based on the size information of the plurality of pictures, the target presenting approach corresponding to the size information of the original picture and the presenting approach, the machine readable instructions cause the processor to:
   determine a picture presenting template matching a number of the plurality of pictures, the picture presenting template comprising a presenting position and a presenting size of at least one picture; and
   determine the target presenting approach based on the size information of the plurality of pictures, and the presenting size in the picture presenting template.

11. The computer device of claim 7, wherein the machine readable instructions further cause the processor to:
   in response to the edit command, obtain the target text;
   generate the picture-text media content based on the target text; and
   send, upon receiving the publishing command, the picture-text media content to the server.

12. The computer device of claim 7, wherein the machine readable instructions further cause the processor to:
in response to an adjusting operation for at least one of: the original picture or the target text, adjust at least one of: the original picture or the target text; and
determine, upon performing adjusting, a third presenting approach corresponding to size information of the adjusted original picture, wherein
to process the original picture based on the target presenting approach, the machine readable instructions cause the processor to:
process, based on the third presenting approach, the adjusted original picture.

13. A non-transitory computer readable storage medium having a computer program stored thereon, wherein the computer program, when is executed by a processor, causes the processor to:
obtain, in response to an edit command, an original picture and target text;
determine, based on size information of the original picture, a target presenting approach corresponding to the size information of the original picture;
process the original picture based on the target presenting approach, and presenting a picture-text media content in real time based on a processed target picture, the target text, and the target presenting approach; and
send, upon receiving a publishing command, the picture-text media content to a server to cause the server to add the picture-text media content to information stream data and push the information stream data to a target client, and for presentation on a full-screen presenting interface of the target client, wherein the full-screen presenting interface is used to present a single media content in the information stream data,
wherein in response to the obtained original picture comprising a plurality of pictures, to determine, based on the size information of the original picture, the target presenting approach corresponding to the size information of the original picture, the computer program further causes the processor to:
determine a presenting approach of the plurality of pictures, the presenting approach comprising a sequential presenting, or a tile presenting; and
determine, based on size information of the plurality of pictures, the target presenting approach corresponding to the size information of the original picture and the presenting approach;
wherein in response to the presenting approach being the sequential presenting, to determine, based on the size information of the plurality of pictures, the target presenting approach corresponding to the size information of the original picture and the presenting approach, the computer program further causes the processor to:
determine, based on size information of a first picture in the plurality of pictures, a first presenting approach matching the first picture in the target presenting approach; and
determine a second presenting approach of other pictures than the first picture based on a container size matching a presenting size of the first picture, and size information of the other pictures, in the first presenting approach, wherein a container of the first picture has a same size as the presenting size of the first picture and the container of the first picture is used as a container of the other pictures without modifying aspect ratios of the other pictures in the second presenting approach, and
wherein the size information of the original picture comprises a pixel size and an aspect ratio of the original picture.

14. The non-transitory computer readable storage medium of claim 13, wherein in the second presenting approach, the other pictures are scaled up or down within the container to a size not greater than a container size of the original picture, according to original ratios, to obtain target pictures corresponding to the other pictures, and the target pictures corresponding to the other pictures are presented in the container.

15. The non-transitory computer readable storage medium of claim 13, wherein the target presenting approach comprises at least one of first presenting area information of the processed target picture, second presenting area information of the target text, a presenting size of the target picture, and image area information to be presented in the original picture.

16. The non-transitory computer readable storage medium of claim 13, wherein in response to the presenting approach being the tile presenting, to determine, based on the size information of the plurality of pictures, the target presenting approach corresponding to the size information of the original picture and the presenting approach, the computer program further causes the processor to:
determine a picture presenting template matching a number of the plurality of pictures, the picture presenting template comprising a presenting position and a presenting size of at least one picture; and
determine the target presenting approach based on the size information of the plurality of pictures, and the presenting size in the picture presenting template.

17. The non-transitory computer readable storage medium of claim 13, wherein the computer program further causes the processor to:
in response to the edit command, obtain the target text;
generate the picture-text media content based on the target text; and
send, upon receiving the publishing command, the picture-text media content to the server.

18. The non-transitory computer readable storage medium of claim 13, wherein the computer program further causes the processor to:
in response to an adjusting operation for at least one of: the original picture or the target text, adjust at least one of: the original picture or the target text; and
determine, upon performing adjusting, a third presenting approach corresponding to size information of the adjusted original picture, wherein
to process the original picture based on the target presenting approach, the computer program causes the processor to:
process, based on the third presenting approach, the adjusted original picture.

* * * * *